J. J. KENNEDY.
MUTOSCOPE.
APPLICATION FILED SEPT. 10, 1915.
1,182,280. Patented May 9, 1916.
2 SHEETS—SHEET 2.
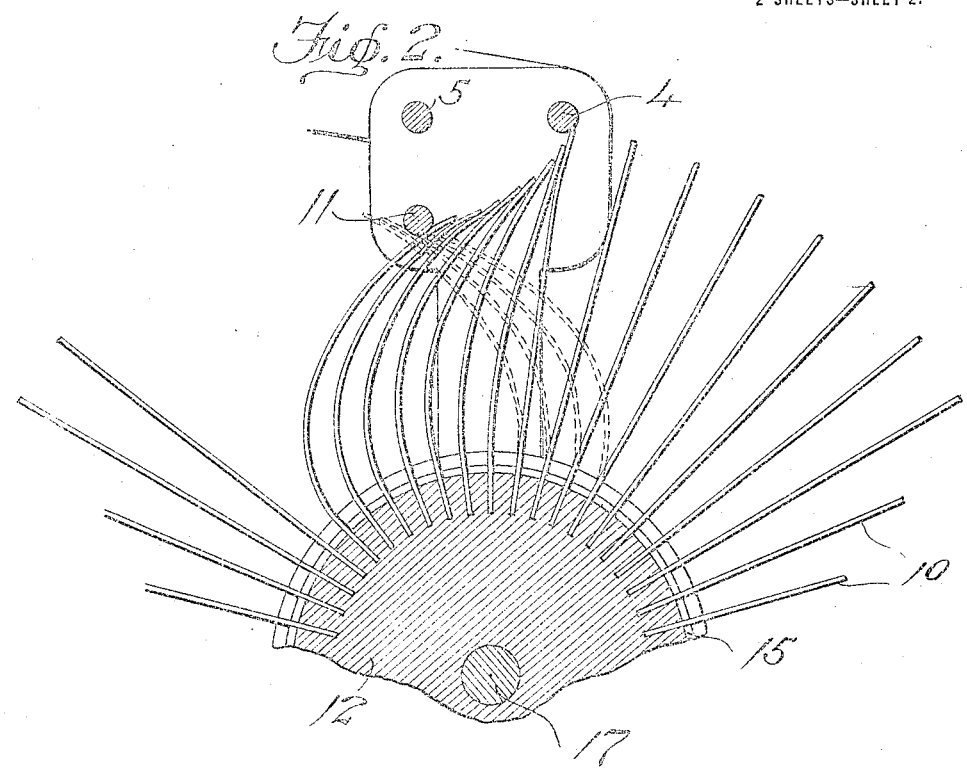
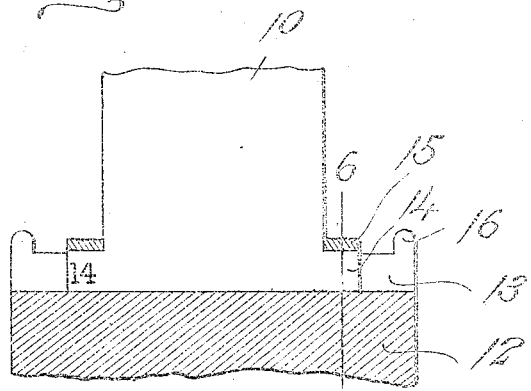
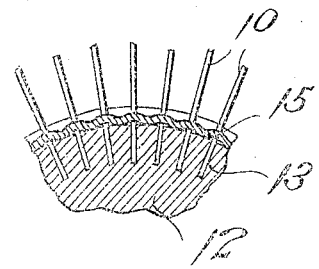
INVENTOR
James J. Kennedy,
BY
ATTORNEY
WITNESSES

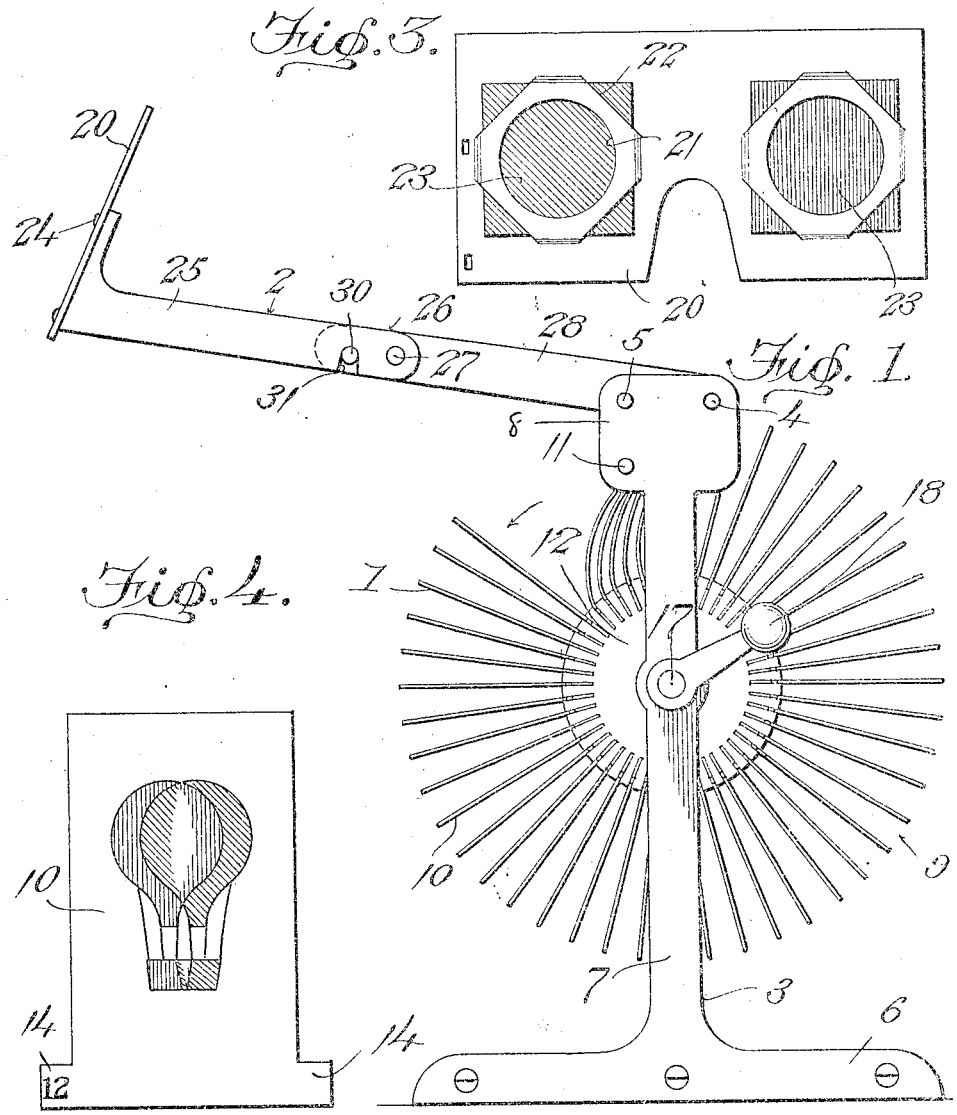

UNITED STATES PATENT OFFICE.

JAMES J. KENNEDY, OF BROOKLYN, NEW YORK.

MUTOSCOPE.

1,182,280.  Specification of Letters Patent.  Patented May 9, 1916.

Application filed September 10, 1915. Serial No. 49,997.

*To all whom it may concern:*

Be it known that I, JAMES J. KENNEDY, a citizen of the United States, residing at Brooklyn, in the county of Kings and State of New York, have invented certain new and useful Improvements in Mutoscopes, of which the following is a specification.

This invention relates generally to improvements in consecutive view-apparatus and more particularly to an improved muto-scope or picture exhibiting instrument designed to reproduce to an observer the motions of various objects by passing before his or her eyes, in rapid succession and in proper sequence, a consecutive series of views illustrating such objects.

The invention is embodied in the manner of attaching the pictures together and to the flexible holder therefor, which, in the present instance, is adapted to be secured around a rotating cylinder and thus form, what I shall hereinafter term a "picture wheel."

The invention further includes a novel support for the picture wheel as well as a stereoscope attachment therefor; the latter, the stereoscope being reversible or movable at the option of the observer into either of two positions that pictures or photographs on opposite sides of the picture cards may be viewed in the manner stated and with facility, clarity and ease.

The above and additional objects are accomplished by such means as are illustrated in their preferred embodiment in the accompanying drawings, described in the following specification and then more particularly pointed out in the claims which are appended hereto and form a part of this application.

In describing my invention in detail reference will be had to the accompanying drawings wherein like characters denote like or corresponding parts throughout the several views; and in which:—

Figure 1 is a side elevation of my improved muto-scope with the stereoscope attachment mounted thereon; Fig. 2 is an enlarged fragmentary sectional view of the picture wheel; Fig. 3 is a detail elevation of the stereoscope; Fig. 4 is a detail elevation of one of the colored picture cards; Fig. 5 is a fragmentary sectional view illustrating the attachment means for the mentioned cards; and Fig. 6 is a fragmentary sectional view on the line 6—6 of Fig. 5.

Before proceeding with a description of the drawings I desire to call particular attention to the fact that while I have evolved my invention with reference to its use in connection with colored pictures and colored lenses, pictures in black and white may be readily and properly viewed, the lenses in the latter instance being of course of the common type.

Proceeding now with a description of the drawings, the numeral 1 designates as an entirety the muto-scope and 2 as an entirety the stereoscope, the latter having a detachable connection with the support 3 for the muto-scope as indicated at 4 and 5 in Fig. 1. The said support 3 may be said to consist of a base plate 6, uprights 7—7 and enlargements 8—8 formed, one enlargement at the upper extremity of each standard 7. A picture wheel, designated as an entirety by the numeral 9 is mounted for rotation between the standards 7 of the support in such proximity to the enlargement 8 as to successively contact the several picture cards 10 forming a part of the picture wheel with a pin 11 in the nature of a detent, connecting the enlargements 8 and bracing the standards of the support.

A spool or cylinder 12 provided with radial longitudinal grooves 13 affords a means whereby the several picture cards 10 are supported for proper engagement with the detent 11 upon rotation of the picture wheel. Each of the several picture cards is numbered successively that the pictures, in assembling the device may be displayed for view in proper sequence. Each card 10 is laterally extended or enlarged as indicated at 14 in Fig. 5 that the fastening means 15 may contact therewith to hold said cards radially with respect to the rotating cylinder or spool. The said fastening means consists of duplicate flexible and elastic bands disposed, one around each end of the spool or cylinder to contact with the enlargements 14 of the picture cards as before suggested that the said cards may be held in contact with the cylinder and against radial displacement with respect to the cylinder grooves. Annular flanges 16 formed at the cylinder ends will preclude lateral displacement of both the cards and said bands.

A shaft 17, concentric to the cylinder 12 acts as a support therefor, said shaft engaging the standards 7 which in turn support the mentioned shaft in the manner desired. A crank handle 18 is fastened to the shaft that the wheel 9 may be rotated by hand and at the desired or requisite speed.

The foregoing description of the mutoscope device would indicate that each of the several picture cards may be brought into successive contact with the detent 11 through rotation of the picture wheel. Each card is inherently flexible or resilient for a purpose obvious to those familiar with this particular art.

Coming now to a description of the stereoscope attachment 2, 20 designates the lens supporting plate having openings 21 formed therein. Diametrically opposed slits 22 are formed in the plate 20 to provide for the attachment of colored lenses 23 thereto. Said plate 20 is secured as at 24 to a section 25 of the supporting arm therefor designated as an entirety by the numeral 26. Said arm 26 is fastened to the plate 20 in such relation to the picture wheel as to dispose the openings 21 in said plate in such proximity to the picture cards as to permit of ready observation therethrough. Section 25 of the arm 26 is pivoted as at 27 to a section 28 directly fastened as indicated at 4 and 5 to the mutoscope support 3. That the section 25 may be maintained in alined relation when extended relatively to the section 28, I provide a pin 30, formed at the end of said section 28, said pin being adapted for fitting engagement within a notch 31 therefor formed in the section 25. The connection at 4 and 5 is such in its nature as to permit, when desired, the stereoscope to be removed and reversed that pictures or photographs on the opposite faces or sides of the cards 10 may be viewed by rotation of the picture wheel in a counter direction to that indicated by the arrow in Fig. 1. Pin or detent 11 acts as the card contact member regardless of the direction of rotation of the picture wheel.

In practice, it is preferred that colored lenses be used, and upon test it has been proven that green and red are the colors preferred. Pictures in colors (red and green) are likewise utilized in connection with the colored lenses 23. The delineations or animate objects illustrated in the pictures are represented in duplicate and in different colors as indicated in Fig. 4, the mentioned illustrations being superimposed. To indicate an approaching movement of the animate objects illustrated by the pictures, the superimposed delineations are laterally offset to a considerable extent when at a point representing the nearest approach to the observer, the said delineations gradually merging until a unit is in evidence thereby indicating that the object has receded to a point far removed from the observer. The delineations or illustrations are of course reduced in size as the receding movement is represented and increased in size as the approaching movement is represented. By using colored lenses and colored pictures, the green lenses will absorb the "green" in the picture and the red lens the "red" therein.

From the foregoing it will be readily observed that by reversing the scheme outlined above, that is, by showing the two colors of any part or object, in the picture less and less farther apart until red and green substantially merge (the series of pictures being made to pass over the field of vision in their proper sequence to give motion) the object or animate part of the picture will have a receding effect. Thus by employing this stereoscopic principle to motion pictures, certain parts of the whole scene are made to recede or approach as the colors are exactly one over the other, or (to a certain extent only) shifted horizontally.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus fully described my invention, what I claim as new and desire to secure by Letters Patent, is:—

1. In a muto-scope, a rotatable cylinder having a plurality of radial longitudinal grooves formed therein, a plurality of picture cards arranged to fit, one card within each groove to radiate uniformly from said cylinder, lateral extensions formed on each of the several cards, and elastic means embracing the cylinder to engage with the several extensions to afford a fastening means for said cards.

2. In a muto-scope, a rotatable cylinder, said cylinder having a plurality of radially arranged longitudinal grooves formed therein, a plurality of cards arranged to fit, one within each groove, lateral extensions formed on each of the several cards, each of the several cards being numbered sequentially to facilitate assemblage, elastic bands embracing said cylinder and engaging the said extensions to afford a fastening means for said cards, and a means to flex the cards during rotation of the cylinder.

3. In a muto-scope, a support comprising a base plate, uprights leading therefrom in spaced parallel relation, a shaft journaled in said uprights, a cylinder concentric to said shaft, said cylinder having a plurality of radially arranged longitudinal grooves formed therein, a plurality of cards arranged to fit, one within each groove, lateral extensions formed on each of the several cards, each of the several cards being numbered sequentially to facilitate assemblage, elastic bands embracing said cylinder and engaging the said extensions to afford a fastening means for said cards, and a means on the support to engage with the cards during the rotation of the cylinder to flex the cards, substantially as described.

4. In a muto-scope, a rotatable cylinder, cards arranged radially with respect to said cylinder, lateral extensions formed on each of the several cards, each of the several cards being numbered sequentially to facilitate assemblage, elastic bands embracing said cylinder and engaging the said extensions to afford a fastening means for said cards, and a means to flex the cards during rotation of the cylinder.

5. In a muto-scope, a rotatable cylinder, said cylinder having a plurality of radially arranged longitudinal grooves formed therein, a plurality of cards arranged to fit, one within each groove, lateral extensions formed on each of the several cards, and means embracing said cylinder and engaging with said extensions to afford a fastening means for said cards, substantially as described.

6. In a muto-scope, a rotatable cylinder, a plurality of radial picture cards fastened to said cylinder, lateral extensions formed on each of the several cards, and a band arranged to embrace said cylinder and engage with the several extensions to afford a fastening means for the several cards, substantially as described.

In testimony whereof I affix my signature in presence of two witnesses.

JAMES J. KENNEDY.

Witnesses:
WILLIAM ALLAN,
ALEC LESLIE ALLAN.